(12) United States Patent
Swix et al.

(10) Patent No.: US 8,959,542 B2
(45) Date of Patent: *Feb. 17, 2015

(54) METHODS, SYSTEMS, AND PRODUCTS FOR EVALUATING PERFORMANCE OF VIEWERS

(71) Applicant: AT&T Intellectual Property I, L.P., Atlanta, GA (US)

(72) Inventors: Scott R. Swix, Rockford, MI (US); William R. Matz, Atlanta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/896,476

(22) Filed: May 17, 2013

(65) Prior Publication Data

US 2013/0254788 A1 Sep. 26, 2013

Related U.S. Application Data

(63) Continuation of application No. 11/820,688, filed on Jun. 20, 2007, now Pat. No. 8,468,556, which is a continuation of application No. 11/183,450, filed on Jul. 18, 2005, now Pat. No. 7,269,835, which is a continuation of application No. 10/036,677, filed on Dec. 21, 2001, now Pat. No. 7,086,075.

(51) Int. Cl.
*H04N 7/16* (2011.01)
*H04H 60/33* (2008.01)
*H04N 21/442* (2011.01)
*G06Q 30/02* (2012.01)
*G09B 7/00* (2006.01)
*H04H 20/28* (2008.01)

(Continued)

(52) U.S. Cl.
CPC ......... *H04N 21/44222* (2013.01); *G06Q 30/02* (2013.01); *G09B 7/00* (2013.01); *H04H 20/28* (2013.01); *H04H 60/33* (2013.01); *H04H 60/63* (2013.01); *H04N 7/17309* (2013.01); *H04N 7/17318* (2013.01); *H04N 21/42204* (2013.01); *H04N 21/433* (2013.01); *H04N 21/42213* (2013.01); *H04N 21/4758* (2013.01); *H04N 21/485* (2013.01); *H04N 21/6582* (2013.01); *H04N 21/812* (2013.01)
USPC .................................................. 725/13; 725/9

(58) Field of Classification Search
None
See application file for complete search history.

(56) References Cited

U.S. PATENT DOCUMENTS 3,798,610 A 3/1974 Bliss et al.
3,886,302 A 5/1975 Kosco (Continued)

FOREIGN PATENT DOCUMENTS

EP 0 424 648 2/1991
EP 1 162 840 12/2001

(Continued)

OTHER PUBLICATIONS

U.S. Appl. No. 08/779,306, Grauch.

(Continued)

*Primary Examiner* — Oschta Montoya
(74) *Attorney, Agent, or Firm* — Scott P. Zimmerman, PLLC

(57) ABSTRACT

Methods, systems, and products evaluate performance of a viewer watching programming. A prompt is displayed, and the viewer enters a response to the prompt. The performance of the viewer is based at least partly on a time of the response.

20 Claims, 3 Drawing Sheets

(51) Int. Cl.
*H04H 60/63* (2008.01)
*H04N 7/173* (2011.01)
*H04N 21/422* (2011.01)
*H04N 21/433* (2011.01)
*H04N 21/475* (2011.01)
*H04N 21/485* (2011.01)
*H04N 21/658* (2011.01)
*H04N 21/81* (2011.01)

(56) References Cited

U.S. PATENT DOCUMENTS

| | | |
|---|---|---|
| 3,924,187 A | 12/1975 | Dormans |
| 4,130,833 A | 12/1978 | Chomet |
| 4,258,386 A | 3/1981 | Cheung |
| 4,361,851 A | 11/1982 | Asip et al. |
| 4,488,179 A | 12/1984 | Kruger et al. |
| 4,566,030 A | 1/1986 | Nickerson et al. |
| 4,567,591 A | 1/1986 | Gray et al. |
| 4,598,288 A | 7/1986 | Yarbrough et al. |
| 4,602,279 A | 7/1986 | Freeman |
| 4,688,248 A | 8/1987 | Tomizawa |
| 4,689,661 A | 8/1987 | Barbieri et al. |
| 4,697,209 A | 9/1987 | Kiewitt et al. |
| 4,698,670 A | 10/1987 | Matty |
| 4,720,873 A | 1/1988 | Goodman et al. |
| 4,816,904 A | 3/1989 | McKenna et al. |
| 4,885,632 A | 12/1989 | Mabey et al. |
| 4,890,322 A | 12/1989 | Russell, Jr. |
| 4,912,552 A | 3/1990 | Allison |
| 5,010,585 A | 4/1991 | Garcia |
| 5,038,211 A | 8/1991 | Hallenbeck |
| 5,046,090 A | 9/1991 | Walker et al. |
| 5,046,092 A | 9/1991 | Walker et al. |
| 5,055,924 A | 10/1991 | Skutta |
| 5,173,900 A | 12/1992 | Miller et al. |
| 5,191,645 A | 3/1993 | Carlucci et al. |
| 5,208,665 A | 5/1993 | McCalley et al. |
| 5,247,347 A | 9/1993 | Litteral et al. |
| 5,249,044 A | 9/1993 | VonKohorn |
| 5,251,324 A | 10/1993 | McMullan, Jr. |
| 5,287,181 A | 2/1994 | Holman |
| 5,335,277 A | 8/1994 | Harvey et al. |
| 5,339,315 A | 8/1994 | Maeda et al. |
| 5,343,240 A | 8/1994 | Yu |
| 5,357,276 A | 10/1994 | Banker et al. |
| 5,374,951 A | 12/1994 | Welsh |
| 5,382,970 A | 1/1995 | Kiefl |
| 5,389,964 A | 2/1995 | Oberle |
| 5,404,393 A | 4/1995 | Remillard |
| 5,410,326 A | 4/1995 | Goldstein |
| 5,410,344 A | 4/1995 | Graves |
| 5,436,653 A | 7/1995 | Ellis et al. |
| 5,440,334 A | 8/1995 | Walters et al. |
| 5,444,499 A | 8/1995 | Saitoh |
| 5,446,490 A | 8/1995 | Blahut et al. |
| 5,446,919 A | 8/1995 | Wilkins |
| 5,481,294 A | 1/1996 | Thomas et al. |
| 5,497,185 A | 3/1996 | Dufresne et al. |
| 5,500,681 A | 3/1996 | Jones |
| 5,504,519 A | 4/1996 | Remillard |
| 5,532,732 A | 7/1996 | Yuen et al. |
| 5,532,735 A | 7/1996 | Blahut et al. |
| 5,534,911 A | 7/1996 | Levitan |
| 5,537,143 A | 7/1996 | Steingold et al. |
| 5,559,548 A | 9/1996 | Davis |
| 5,579,124 A | 11/1996 | Aijala et al. |
| 5,585,838 A | 12/1996 | Lawler et al. |
| 5,585,865 A | 12/1996 | Amano |
| 5,589,892 A | 12/1996 | Knee et al. |
| 5,596,994 A | 1/1997 | Bro |
| 5,600,364 A | 2/1997 | Hendricks |
| 5,600,366 A | 2/1997 | Schulman |
| 5,606,359 A | 2/1997 | Youden et al. |
| 5,606,602 A | 2/1997 | Johnson et al. |
| 5,608,448 A | 3/1997 | Smoral et al. |
| 5,619,247 A | 4/1997 | Russo |
| 5,630,119 A | 5/1997 | Aristides |
| 5,649,200 A | 7/1997 | Leblang et al. |
| 5,659,350 A | 8/1997 | Hendricks |
| 5,661,516 A | 8/1997 | Carles |
| 5,710,815 A | 1/1998 | Ming et al. |
| 5,721,827 A | 2/1998 | Logan |
| 5,724,521 A | 3/1998 | Dedrick |
| 5,724,525 A | 3/1998 | Beyers, II et al. |
| 5,724,607 A | 3/1998 | Brandt |
| 5,740,549 A | 4/1998 | Reilly et al. |
| 5,752,159 A | 5/1998 | Faust et al. |
| 5,754,775 A | 5/1998 | Adamson et al. |
| 5,754,939 A | 5/1998 | Herz |
| 5,758,257 A | 5/1998 | Herz |
| 5,758,259 A | 5/1998 | Lawler |
| 5,774,170 A | 6/1998 | Hite et al. |
| 5,777,614 A | 7/1998 | Ando et al. |
| 5,778,182 A | 7/1998 | Cathey et al. |
| 5,794,210 A | 8/1998 | Goldhaber et al. |
| 5,796,952 A | 8/1998 | Davis et al. |
| 5,798,785 A | 8/1998 | Hendricks et al. |
| 5,809,481 A | 9/1998 | Baron et al. |
| 5,818,438 A | 10/1998 | Howe |
| 5,838,314 A | 11/1998 | Neel |
| 5,848,396 A | 12/1998 | Gerace |
| 5,848,397 A | 12/1998 | Marsh et al. |
| 5,850,249 A | 12/1998 | Massetti et al. |
| 5,850,447 A * | 12/1998 | Peyret ............................ 463/29 |
| 5,854,897 A | 12/1998 | Radziewicz et al. |
| 5,861,906 A | 1/1999 | Dunn |
| 5,867,226 A | 2/1999 | Wehmeyer et al. |
| 5,872,588 A | 2/1999 | Aras et al. |
| 5,872,834 A | 2/1999 | Teitelbaum et al. |
| 5,883,942 A | 3/1999 | Lim et al. |
| 5,892,508 A | 4/1999 | Howe |
| 5,892,536 A | 4/1999 | Logan |
| 5,900,908 A | 5/1999 | Kirkland |
| 5,901,209 A | 5/1999 | Tannhenbaum et al. |
| 5,917,481 A | 6/1999 | Rzeszewski |
| 5,931,908 A * | 8/1999 | Gerba et al. .................. 709/219 |
| 5,945,988 A | 8/1999 | Williams et al. |
| 5,946,636 A | 8/1999 | Uyeno et al. |
| 5,948,061 A | 9/1999 | Merriman et al. |
| 5,973,683 A | 10/1999 | Cragun |
| 5,983,227 A | 11/1999 | Nazem |
| 5,991,735 A | 11/1999 | Gerace |
| 5,991,799 A | 11/1999 | Yen et al. |
| 6,002,393 A | 12/1999 | Hite |
| 6,005,597 A | 12/1999 | Barrett |
| 6,026,368 A | 2/2000 | Brown et al. |
| 6,029,045 A | 2/2000 | Picco et al. |
| 6,029,195 A | 2/2000 | Herz |
| 6,076,094 A | 6/2000 | Cohen |
| 6,081,840 A | 6/2000 | Zhao |
| 6,100,916 A | 8/2000 | August |
| 6,119,098 A | 9/2000 | Guyot et al. |
| 6,128,009 A | 10/2000 | Ohkura et al. |
| 6,134,531 A | 10/2000 | Trewitt et al. |
| 6,134,532 A | 10/2000 | Lazarus |
| 6,160,570 A | 12/2000 | Sitnik |
| 6,163,644 A | 12/2000 | Owashi et al. |
| 6,172,674 B1 | 1/2001 | Etheredge |
| 6,172,677 B1 | 1/2001 | Stautner et al. |
| 6,177,931 B1 | 1/2001 | Alexander et al. |
| D437,879 S | 2/2001 | Weinandt |
| 6,185,614 B1 | 2/2001 | Cuomo |
| 6,199,076 B1 | 3/2001 | Logan et al. |
| 6,202,210 B1 | 3/2001 | Judtke |
| 6,226,618 B1 | 5/2001 | Downs et al. |
| 6,236,975 B1 | 5/2001 | Boe et al. |
| 6,252,586 B1 | 6/2001 | Freeman et al. |
| 6,253,189 B1 | 6/2001 | Feezell et al. |
| 6,279,157 B1 | 8/2001 | Takasu |
| 6,282,713 B1 | 8/2001 | Kitsukawa |
| 6,286,042 B1 | 9/2001 | Hasselberg et al. |
| 6,292,549 B1 | 9/2001 | Lung et al. |
| 6,304,644 B2 | 10/2001 | Karnowski |

(56) References Cited

U.S. PATENT DOCUMENTS

| | | |
|---|---|---|
| 6,310,943 B1 | 10/2001 | Kowlaski |
| 6,314,568 B1 | 11/2001 | Ochiai |
| 6,314,577 B1 | 11/2001 | Pocock |
| 6,317,488 B1 | 11/2001 | DePond et al. |
| 6,324,271 B1 | 11/2001 | Sawyer et al. |
| 6,327,574 B1 | 12/2001 | Kramer et al. |
| 6,332,021 B2 | 12/2001 | Latter et al. |
| 6,338,043 B1 | 1/2002 | Miller |
| 6,339,639 B1 | 1/2002 | Henderson |
| 6,341,161 B1 | 1/2002 | Latter et al. |
| 6,345,187 B1 | 2/2002 | Berthoud et al. |
| 6,345,256 B1 | 2/2002 | Milsted et al. |
| 6,351,637 B1 | 2/2002 | Lee |
| 6,353,929 B1 | 3/2002 | Houston |
| 6,366,772 B1 | 4/2002 | Arnson |
| 6,397,057 B1 | 5/2002 | Malackowski et al. |
| 6,400,408 B1 | 6/2002 | Berger |
| 6,408,437 B1 | 6/2002 | Hendricks et al. |
| 6,427,003 B1 | 7/2002 | Corbett |
| 6,434,747 B1 | 8/2002 | Khoo et al. |
| 6,438,216 B1 | 8/2002 | Aktas |
| 6,442,262 B1 | 8/2002 | Moss et al. |
| 6,442,263 B1 | 8/2002 | Beaton et al. |
| 6,445,781 B1 | 9/2002 | Heinmiller et al. |
| 6,446,261 B1 | 9/2002 | Rosser |
| 6,457,010 B1 | 9/2002 | Eldering |
| 6,463,468 B1 | 10/2002 | Bush |
| 6,463,585 B1 | 10/2002 | Hendricks et al. |
| 6,477,704 B1 | 11/2002 | Cremia |
| 6,480,589 B1 | 11/2002 | Lee et al. |
| 6,487,538 B1 | 11/2002 | Gupta et al. |
| 6,493,439 B2 | 12/2002 | Lung et al. |
| 6,496,569 B2 | 12/2002 | Pelletier et al. |
| 6,496,571 B1 | 12/2002 | Wilson |
| 6,496,818 B1 | 12/2002 | Ponte |
| 6,498,841 B2 | 12/2002 | Bull et al. |
| 6,505,348 B1 | 1/2003 | Knowles |
| 6,507,839 B1 | 1/2003 | Ponte |
| 6,510,417 B1 | 1/2003 | Woods |
| 6,529,591 B1 | 3/2003 | Dosani et al. |
| 6,530,082 B1 | 3/2003 | DelSesto et al. |
| 6,542,583 B1 | 4/2003 | Taylor |
| 6,542,591 B1 | 4/2003 | Amro et al. |
| 6,546,092 B2 | 4/2003 | Corbett et al. |
| 6,553,110 B1 | 4/2003 | Peng |
| 6,553,178 B2 | 4/2003 | Abecassis |
| 6,560,317 B1 | 5/2003 | Quagliana |
| 6,560,327 B1 | 5/2003 | McConnell |
| 6,570,971 B2 | 5/2003 | Latter et al. |
| 6,571,344 B1 | 5/2003 | Sitnik |
| 6,574,319 B2 | 6/2003 | Latter et al. |
| 6,584,490 B1 | 6/2003 | Schuster et al. |
| 6,631,181 B1 | 10/2003 | Bates et al. |
| 6,631,360 B1 | 10/2003 | Cook |
| 6,639,979 B1 | 10/2003 | Kim |
| 6,647,548 B1 | 11/2003 | Lu et al. |
| 6,650,743 B2 | 11/2003 | Heinmiller et al. |
| 6,675,383 B1 | 1/2004 | Wheeler et al. |
| 6,698,020 B1 | 2/2004 | Zigmond et al. |
| 6,714,992 B1 | 3/2004 | Kanojia et al. |
| 6,718,021 B2 | 4/2004 | Crockett et al. |
| 6,718,551 B1 | 4/2004 | Swix et al. |
| 6,728,355 B2 | 4/2004 | Kowalski |
| 6,731,727 B2 | 5/2004 | Corbett et al. |
| 6,738,978 B1 | 5/2004 | Hendricks et al. |
| 6,748,058 B1 | 6/2004 | Schwend et al. |
| 6,748,068 B1 | 6/2004 | Walsh et al. |
| 6,757,691 B1 | 6/2004 | Welsh et al. |
| 6,766,003 B2 | 7/2004 | Moss et al. |
| 6,766,524 B1 * | 7/2004 | Matheny et al. ............... 725/23 |
| D494,953 S | 8/2004 | Leung |
| 6,771,754 B2 | 8/2004 | Pelletier et al. |
| 6,771,755 B1 | 8/2004 | Simpson |
| 6,772,209 B1 | 8/2004 | Chernock |
| 6,785,301 B1 | 8/2004 | Chapman et al. |
| 6,785,368 B1 | 8/2004 | Eason et al. |
| 6,798,879 B1 | 9/2004 | Beham |
| 6,807,267 B2 | 10/2004 | Moss et al. |
| 6,810,115 B2 | 10/2004 | Fukuda |
| 6,810,527 B1 | 10/2004 | Conrad et al. |
| 6,816,481 B1 | 11/2004 | Adams et al. |
| 6,826,271 B1 | 11/2004 | Kanabar et al. |
| 6,831,974 B1 | 12/2004 | Watson et al. |
| 6,845,151 B2 | 1/2005 | Peng |
| 6,845,396 B1 | 1/2005 | Kanojia |
| 6,845,398 B1 | 1/2005 | Galensky |
| 6,850,988 B1 | 2/2005 | Reed |
| 6,950,804 B2 | 9/2005 | Strietzel |
| 6,970,641 B1 | 11/2005 | Pierre |
| 6,976,268 B2 | 12/2005 | Courtney |
| 6,983,478 B1 | 1/2006 | Grauch et al. |
| 6,985,882 B1 | 1/2006 | Del Sesto |
| 7,000,245 B1 | 2/2006 | Pierre |
| 7,010,492 B1 | 3/2006 | Bassett et al. |
| 7,020,336 B2 | 3/2006 | Cohen-Solal |
| 7,020,652 B2 | 3/2006 | Matz |
| 7,039,599 B2 | 5/2006 | Merriman |
| 7,039,932 B2 | 5/2006 | Eldering |
| 7,086,075 B2 | 8/2006 | Swix |
| 7,100,183 B2 | 8/2006 | Kunkel et al. |
| 7,212,979 B1 | 5/2007 | Matz et al |
| 7,228,283 B1 | 6/2007 | Hornstein |
| 7,260,823 B2 | 8/2007 | Schlack et al. |
| 7,269,835 B2 | 9/2007 | Swix |
| 7,343,354 B2 | 3/2008 | Hennessey |
| 7,441,260 B1 | 10/2008 | Kurapati |
| 7,444,658 B1 | 10/2008 | Matz |
| 7,587,323 B2 | 9/2009 | Matz |
| 7,587,732 B2 | 9/2009 | Wright et al. |
| 7,593,858 B2 | 9/2009 | Matz |
| 7,617,508 B2 | 11/2009 | Gray |
| 7,661,118 B2 | 2/2010 | Matz |
| 7,979,877 B2 | 7/2011 | Huber et al. |
| 2001/0004733 A1 | 6/2001 | Eldering |
| 2002/0002488 A1 | 1/2002 | Muyres et al. |
| 2002/0004382 A1 | 1/2002 | Cox et al. |
| 2002/0009184 A1 | 1/2002 | Shnier |
| 2002/0013757 A1 | 1/2002 | Bykowsky |
| 2002/0016748 A1 | 2/2002 | Emodi et al. |
| 2002/0016964 A1 | 2/2002 | Aratani et al. |
| 2002/0032906 A1 | 3/2002 | Grossman |
| 2002/0035600 A1 | 3/2002 | Ullman et al. |
| 2002/0046099 A1 | 4/2002 | Frengut et al. |
| 2002/0049631 A1 | 4/2002 | Williams |
| 2002/0049967 A1 | 4/2002 | Haseltine et al. |
| 2002/0056109 A1 | 5/2002 | Tomsen |
| 2002/0056118 A1 | 5/2002 | Hunter et al. |
| 2002/0078443 A1 | 6/2002 | Gadkari et al. |
| 2002/0083441 A1 | 6/2002 | Flickinger et al. |
| 2002/0087573 A1 | 7/2002 | Reuning et al. |
| 2002/0090933 A1 | 7/2002 | Rouse et al. |
| 2002/0092017 A1 | 7/2002 | Klosterman et al. |
| 2002/0092019 A1 | 7/2002 | Marcus |
| 2002/0100064 A1 | 7/2002 | Ward et al. |
| 2002/0122401 A1 | 9/2002 | Xiang et al. |
| 2002/0123928 A1 | 9/2002 | Eldering et al. |
| 2002/0133817 A1 | 9/2002 | Markel |
| 2002/0143647 A1 | 10/2002 | Headings |
| 2002/0157108 A1 | 10/2002 | Kitsukawa et al. |
| 2002/0157109 A1 | 10/2002 | Nakano et al. |
| 2002/0169709 A1 | 11/2002 | Kitayama |
| 2002/0183098 A1 | 12/2002 | Lee et al. |
| 2002/0191755 A1 | 12/2002 | Lew et al. |
| 2002/0199197 A1 | 12/2002 | Winter |
| 2003/0003990 A1 | 1/2003 | Von Kohorn |
| 2003/0028432 A1 | 2/2003 | Troyansky et al. |
| 2003/0028873 A1 | 2/2003 | Lemmons |
| 2003/0049967 A1 | 3/2003 | Narumo et al. |
| 2003/0050100 A1 | 3/2003 | Dent |
| 2003/0067554 A1 | 4/2003 | Klarfeld |
| 2003/0092384 A1 | 5/2003 | Ross, III |
| 2003/0093792 A1 | 5/2003 | Labeeb et al. |
| 2003/0095650 A1 | 5/2003 | Mize |
| 2003/0108184 A1 | 6/2003 | Brown et al. |

(56) References Cited

U.S. PATENT DOCUMENTS

| | | |
|---|---|---|
| 2003/0110489 A1 | 6/2003 | Gudorf et al. |
| 2003/0110497 A1 | 6/2003 | Yassin et al. |
| 2003/0115597 A1 | 6/2003 | Yassin et al. |
| 2003/0148758 A1 | 8/2003 | McMullin |
| 2003/0149975 A1 | 8/2003 | Eldering et al. |
| 2003/0172374 A1 | 9/2003 | Vinson et al. |
| 2004/0125929 A1 | 7/2004 | Pope |
| 2004/0128682 A1 | 7/2004 | Liga et al. |
| 2004/0133467 A1 | 7/2004 | Siler |
| 2004/0163101 A1 | 8/2004 | Swix |
| 2004/0193483 A1 | 9/2004 | Wolan |
| 2004/0193488 A1 | 9/2004 | Khoo et al. |
| 2004/0194131 A1 | 9/2004 | Ellis et al. |
| 2004/0220858 A1 | 11/2004 | Maggio |
| 2004/0248560 A1 | 12/2004 | Bedingfield et al. |
| 2004/0261127 A1 | 12/2004 | Freeman et al. |
| 2005/0060759 A1 | 3/2005 | Rowe et al. |
| 2005/0071863 A1 | 3/2005 | Matz |
| 2005/0084084 A1 | 4/2005 | Cook et al. |
| 2005/0132419 A1 | 6/2005 | Gray |
| 2005/0137958 A1 | 6/2005 | Huber et al. |
| 2005/0235318 A1 | 10/2005 | Grauch |
| 2005/0251820 A1 | 11/2005 | Stefanik |
| 2005/0278741 A1 | 12/2005 | Robarts et al. |
| 2005/0283401 A1 | 12/2005 | Swix |
| 2005/0283792 A1 | 12/2005 | Swix |
| 2006/0031882 A1 | 2/2006 | Swix |
| 2006/0075456 A1 | 4/2006 | Gray |
| 2006/0106710 A1 | 5/2006 | Meek et al. |
| 2006/0161952 A1 | 7/2006 | Herz et al. |
| 2006/0168616 A1 | 7/2006 | Candelore |
| 2006/0253884 A1 | 11/2006 | Gray |
| 2006/0271438 A1 | 11/2006 | Shotland et al. |
| 2006/0271552 A1 | 11/2006 | McChesney et al. |
| 2006/0288367 A1 | 12/2006 | Swix |
| 2007/0038514 A1 | 2/2007 | Patterson et al. |
| 2007/0083885 A1 | 4/2007 | Harding |
| 2007/0226761 A1 | 9/2007 | Zalewski et al. |
| 2007/0250846 A1 | 10/2007 | Swix |
| 2007/0255622 A1 | 11/2007 | Swix |
| 2007/0288350 A1 | 12/2007 | Bykowsky |
| 2008/0004962 A1 | 1/2008 | Muthukrishnan et al. |
| 2008/0104634 A1 | 5/2008 | Gajdos et al. |
| 2008/0147497 A1 | 6/2008 | Tischer |
| 2008/0148311 A1 | 6/2008 | Tischer |
| 2008/0167943 A1 | 7/2008 | O'Neil |
| 2008/0263586 A1 | 10/2008 | Thomas |
| 2009/0292703 A1 | 11/2009 | Matz |
| 2010/0083298 A1 | 4/2010 | Gray |
| 2010/0088725 A1 | 4/2010 | Swix |
| 2010/0191601 A1 | 7/2010 | Matz |
| 2010/0257037 A1 | 10/2010 | Matz |

FOREIGN PATENT DOCUMENTS

| | | |
|---|---|---|
| WO | WO 9222983 | 12/1992 |
| WO | WO 94 17609 | 8/1994 |
| WO | WO 96 07270 | 3/1996 |
| WO | WO 98 31114 | 7/1998 |
| WO | WO 99 04561 | 1/1999 |
| WO | WO 99 45702 | 10/1999 |
| WO | WO 99 52285 | 10/1999 |
| WO | WO 0147156 | 6/2001 |
| WO | WO 03 052551 | 6/2003 |

OTHER PUBLICATIONS

U.S. Appl. No. 10/039,062, Matz.
U.S. Appl. No. 10/020,779, Swix.
www.actv.com, Screen Print, Oct. 8, 2000.
"ACTV, Inc. Offers Exclusive Preview of 'Individualized Television' at Official All-Star Café," Business Wire, Sep. 16, 1998.
"ACTV's HyperTV & 'Individualized Television' to be Powered by Sun Microsystems' JavaTV Technology," Business Wire, Apr. 21, 1999.
Whitaker, Jerry, "Interactive TV: Killer Ap or Technical Curiosity?", Broadcast Engineering, Dec. 1999.
Dickson, Glen, "Digital TV gets specifically directed," Broadcasting & Cable, Jun. 5, 2000.
Reed, David, "The future is digital," Precision Marketing, v. 13, n. 51, p. 27, Sep. 21, 2001.
Wasserman, Todd, "Mining Everyone's Business." Brandweek, Feb. 28, 2000. 19 pages.
Cauley, Leslie, "Microsoft, Baby Bell Form Video Alliance," *The Wall Street Journal*, Sep. 26, 1994.
"allNetDevices:—Report: Interactive TV Soon to Become Direct Marketing Tool," allNetDevices, www.devices.internet.com/com__cgi/print/print.cgi?url=http://devices.../report_interactive.html, (Nov. 16, 2001) pp. 1-2.
"Liberate Technologies—Solutions," Digital Cable Two-Way, www.solutions.liberate.com/architecture/dc2.html, (Nov. 16, 2001) p. 1 of 1.
"Liberate Technologies—Solutions," Digital Broadband Telco, www.solutions.liberate.com/architecture/db.html, (Nov. 16, 2001) p. 1 of 1.
"Liberate Technologies—Solutions," Liberate Connect Suite, www.solutions.liberate.com/products/connect_suite.html, (Nov. 16, 2001) pp. 1-2.
"Liberate Technologies—Solutions," Liberate imprint Server™, www.solutions.liberate.com/products/imprint_server.html, (Nov. 16, 2001) p. 1 of 1.
"Liberate Technologies—Solutions," Liberate Mediacast Server™, www.solutions.liberate.com.products/mediacast_server.html, (Nov. 16, 2001) pp. 1-2.
"Spike High Performance Server Array," Mixed Signals Technologies, Inc., www.mixedsignals.com, itvinfo@mixedsignals.com (2000) p. 1.
"Power, flexibility, and control," RespondTV, www.respondtv.com/whyrespond.html (Nov. 16, 2001) pp. 1-2.
"It just clicks!," RespondTV, www.respondtv.com/inaction.html, (Nov. 16, 2001) pp. 1-2.
"The Wink System," Wink System Diagram, www.wink.com/contents/tech_diagram.html, (Nov. 16, 2001) p. 1 of 1.
"What is Wink?," www.wink.com/contents/whatiswink.html, (Nov. 16, 2001) p. 1 of 1.
"How Wink Works," What is Wink: How wink works, www.wink.com/contents/howitworks.html, (Nov. 16, 2001) p. 1 of 1.
"What is Wink: Examples," What is Wink—Examples, www.wink.com/contents/examples.html, (Nov. 16, 2001) pp. 1-2.
"Nielsen Media Research—Who We Are & What We Do," www.nielsenmedia.com/whoweare.html, (Oct. 11, 2001) pp. 1-4.
Aggarwal et al ("A Framework for the Optimizing of WWW Advertising" Proceedings of the International IFIP/GI Working Conference Trends in Distributed Systems for Electronic Commerce, pp. 1-10, Year of Publication: 1998).
Ehrmantraut et al., "The Personal Electronic Program Guide—Towards the Pre-selection of Individual TV Programs", pp. 1-8, 1996.

\* cited by examiner

METHODS, SYSTEMS, AND PRODUCTS FOR EVALUATING PERFORMANCE OF VIEWERS

CROSS REFERENCE TO RELATED APPLICATION

This application is a continuation of U.S. patent application Ser. No. 11/820,688 filed Jun. 20, 2007 and now issued as U.S. Pat. No. 8,468,556, which is a continuation of U.S. patent application Ser. No. 11/183,450 filed Jul. 18, 2005 and now issued as U.S. Pat. No. 7,269,835, which is a continuation of U.S. patent application Ser. No. 10/036,677 filed Dec. 21, 2001 and now issued as U.S. Pat. No. 7,086,075, with all applications incorporated herein by reference in their entireties.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

The exemplary embodiments generally relate to the field of managing television viewing activities. More specifically, the exemplary embodiments relate to advertising management systems and methods in which timed responses to audio/video (A/V) events in television programming are presented, responded to, and/or tracked.

Advertisements and content may be displayed in between and during the subject portions of television programming. Advertisements are the primary source of revenue for television networks and a major component in the generation of revenue for advertisers. In one example, advertisements are typically ten to ninety seconds in length, and are grouped together as pre-selected breaks in the broadcast of a program, typically occurring from every few to every fifteen minutes of programming. In another example, advertising may be accomplished by subtly placing products within the subject portion of a broadcast, such as during movies, sitcoms, sporting events, etc. The number of advertisements and the timing between the placement of the advertisements is dependent on the type of program and the format of the program (e.g., live or pre-recorded). Television programming typically includes approximately sixteen minutes of advertisements during every hour of programming, providing a large amount of time to present information to consumers. Many advertisers use this time as their primary avenue for promoting products, content, services, and events to consumers.

Television advertising and content is generally more effective when aired during popular television programs that are watched by many viewers who are interested in the types of products or services being advertised. "Targeted advertising" refers to identifying a group of people as being those that have the greatest interest in what is being advertised, and providing the most favorable situation in which the advertisement will reach that pre-determined group of consumers. Advertisers reach these pre-determined groups by strategically placing advertisements and content based on the time of the day, the popularity of a subject program, and the type of advertisement or content shown. Displaying an advertisement to a large audience results in more potential consumers receiving the advertisement, which is likely to result in more revenue being generated. In determining whether a television program may be appropriate for a particular advertisement, advertisers consider viewer categories such as age, gender, income level, and viewer interests.

Broadcasting networks and advertisers are able to gauge which demographic groups are watching which programs using conventional market research tools. For example, the AC Nielsen™ ratings system tracks television viewing activities by sampling a plurality of households, and estimating the number of viewers of particular programs using the viewing activity data.

In order to gauge the effectiveness of their spending, advertisers have long sought information related to potential consumer viewing patterns. There are several conventional devices and techniques that exist for gathering such information. For example, U.S. Pat. No. 4,258,386 issued to Cheung discloses "an apparatus for television audience analysis comprising means for monitoring a television receiver, means responsive to a monitored signal for storing information representative of channel identification and of the time at which a channel is selected and at which the selection of a channel is terminated, and means for reading the stored information periodically."

As another example, U.S. Pat. No. 4,556,030 issued to Nickerson, et al., discloses "a data storage and transmission system for accumulating and transmitting data from a plurality of remote T.V. panelist locations to a central location. Each remote unit includes a microprocessor, a control memory, and a data store memory. The control memory stores control information for the remote unit, which may include dynamic allocation information. The data store memory is event driven and stores data as to television channel selection and times thereof, and can store viewer reaction data and the like. At a pre-selected time, each remote unit initiates a telephone call to a central location and identifies itself. Upon successful telephone connection between a remote unit and the central location, any data such as viewer habit and/or reaction data and the like contained in the data store memory is transmitted over the telephone line to the central location."

Other conventional systems and methods provide somewhat more use data than only channel numbers viewed and the time of viewing, such as which products panelists purchase. U.S. Pat. No. 4,816,904 issued to McKenna, et al., discloses "a data gathering system including a plurality of remote units which are controlled from a central location. Each of the remote units are attached to a television receiver which is generally, but not necessarily, attached to a cable system. Each of the remote units may function to determine which of several TV modes is in use as well as to store TV channel selector data, data from an optical input device, and/or data input by viewers representative of the composition of the viewing audience. The data is stored for either later collection by a portable data collector, or for direct transmission via telephone to the central location. A video message for a TV viewer, such as a survey, may be transmitted from the central location and stored at the remote units, for later display on the TV receiver associated with the remote units. The substitution of alternate programming information may also be achieved by the central control point on selected of the remote units."

Conventionally, panelist monitoring may be used to gauge the effectiveness of advertising and content on a selected group of panelists. Nevertheless, while panelist monitoring systems like those described above provide somewhat more monitoring data than just TV tuning data, they do so only for limited groups. For example, when more data is gathered (like purchase information), it is done only for the panelist groups, rather than for subscribers of the entire system.

Conventional systems typically capture ratings information that identifies which television shows are viewed, rather than whether the subscriber also viewed the commercials displayed during those shows. What is important to an advertiser is that potential consumers are interested in an advertisement enough to sit through its duration. There is a great deal of money invested in advertising, with the hopes that it will return even greater profits. Conventional systems do not result in adequate amounts of viewing information and feedback being generated, and are not efficient in presenting the information to and rewarding viewers for participating in television programming.

Accordingly, there are needs for gathering more detailed viewer information, establishing two-way communication with a viewer in order to collect the detailed information, and systems and methods for processing the detailed information in order to accomplish the goals of both a viewer and a provider, such as, for example, requesting certain types of information and receiving information and incentives based upon viewer participation.

SUMMARY

According to exemplary embodiments, the needs described above and other needs are met by providing highly efficient systems and methods whereby audio/visual cues and/or events are presented to viewers of a television program, advertisement, and/or other content. Some of the systems and methods include recording response times to the audio/visual cues or events provided by the viewer by actuating a key on a user input device, such as a remote control unit. Viewer response times are then processed and evaluated for the purposes of competition, discounts, incentives, awards, polling, surveying, and/or other purposes.

Some of the embodiments of this invention present a cue and/or event to a viewer to using standard or time-tag enhanced television programming (or other media programming) and any conventional set top box (or alternate media delivery device) equipped with demographics and programming collection and analysis systems that may be deployed for use on an interactive media delivery system.

Some of the embodiments of this invention builds upon the ability of a set top box processor to record the actions of a viewer while watching television. By actuating a key on a remote control unit based upon audio/visual cues, viewer behavior may be recorded, transmitted if necessary, and then processed in order to evaluate the viewer behavior. Since each viewer action is time-stamped, a recreation of the viewer action sequence in time may be generated, which may be compared against any known sequence of events.

In the exemplary embodiments, a television programming stream (network show, advertisement, gaming program, polling program, survey program, etc.) is presented over a particular period of time may include one or more intentional or incidental occurrences of audio/video content or events, such as the display of products, a word, a sound, an action by an actor, an effect, or any other recognizable event. Responses to these cues may be used as part of an award, incentive, measurement, market test, individual skill (including visual) measurement, marketing, customer sensitivity to product measurement program, and game/contest/entertainment device.

According to an exemplary method for providing an incentive for a viewer to watch network programming, a prompt (also referred to herein as a "cue") is presented with the television programming stream (or alternate media stream) to provide an indicated response to an event within an indicated time period. The viewer may react and respond to the prompt by actuating a pushbutton of a remote control device (or other means for communicating a response to the prompt to the set-top box). Thereafter, the response to the event is detected, a response time of the indicated response to the event is measured, viewer performance is evaluated based upon the response time, and the incentive may be presented to the viewer based upon the response time. The incentive may be presented with the television programming stream or with an alternate media stream to the set-top box.

The event may comprise one or more intentional or incidental occurrences of audio/visual content broadcast to the viewer during the television programming stream. The indicated response to the event may be time-stamped and used to create a viewer's action log from the indicated response and the response time, which may be compared against any known sequence of events.

In one of the exemplary embodiments, the indicated response to the event is provided by the viewer actuating a pushbutton key on a set-top box remote control unit which transmits an encoded signal when the viewer identifies the one or more intentional or incidental occurrences of audio/visual content.

In another exemplary embodiment, a display device of a media delivery device presents an incentive to a viewer to watch network programming. The media delivery device includes a decoder operable for decoding broadcast media programming into the media delivery device, a processor operable for generating incidental or intentional occurrences of audio/visual cues to be inserted into the media delivery device, a sensor operable for detecting viewer responses to the incidental or intentional occurrences of audio/visual cues, a processor operable for measuring the response time of the viewer's response, and a processor operable for evaluating the viewer's response by comparing the response time against any known sequence of events, the results of which are used to provide an incentive to the viewer based upon the evaluation.

In a further exemplary embodiment, the media delivery device includes a network connection operable for transmitting encoded signals between the media delivery device and an external network, and wherein the media delivery device receives prompts from the external network and the external network receives notification for the viewer's response and the response time.

Other systems, methods, and/or computer program products according to some of the embodiments will be or become apparent to one with skill in the art upon review of the following drawings and detailed description. It is intended that all such additional systems, methods, and/or computer program products be included within and protected by this description and be within the scope of this invention.

DESCRIPTION OF THE DRAWINGS

The above and other embodiments, objects, uses, advantages, and novel features are more clearly understood by reference to the following description taken in connection with the accompanying figures, wherein.

DETAILED DESCRIPTION OF EXEMPLARY EMBODIMENTS

The exemplary embodiments now will be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, flowcharts, illustrations, and the like represent conceptual views or processes illustrating systems, methods and computer program products embodying some of the embodiments of this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing some of the embodiments of this invention. Those of ordinary skill in the art further understand that the exemplary hardware, software, processes, methods, and/or operating systems described herein are for illustrative purposes and, thus, are not intended to be limited to any particular named manufacturer.

Figure 1:
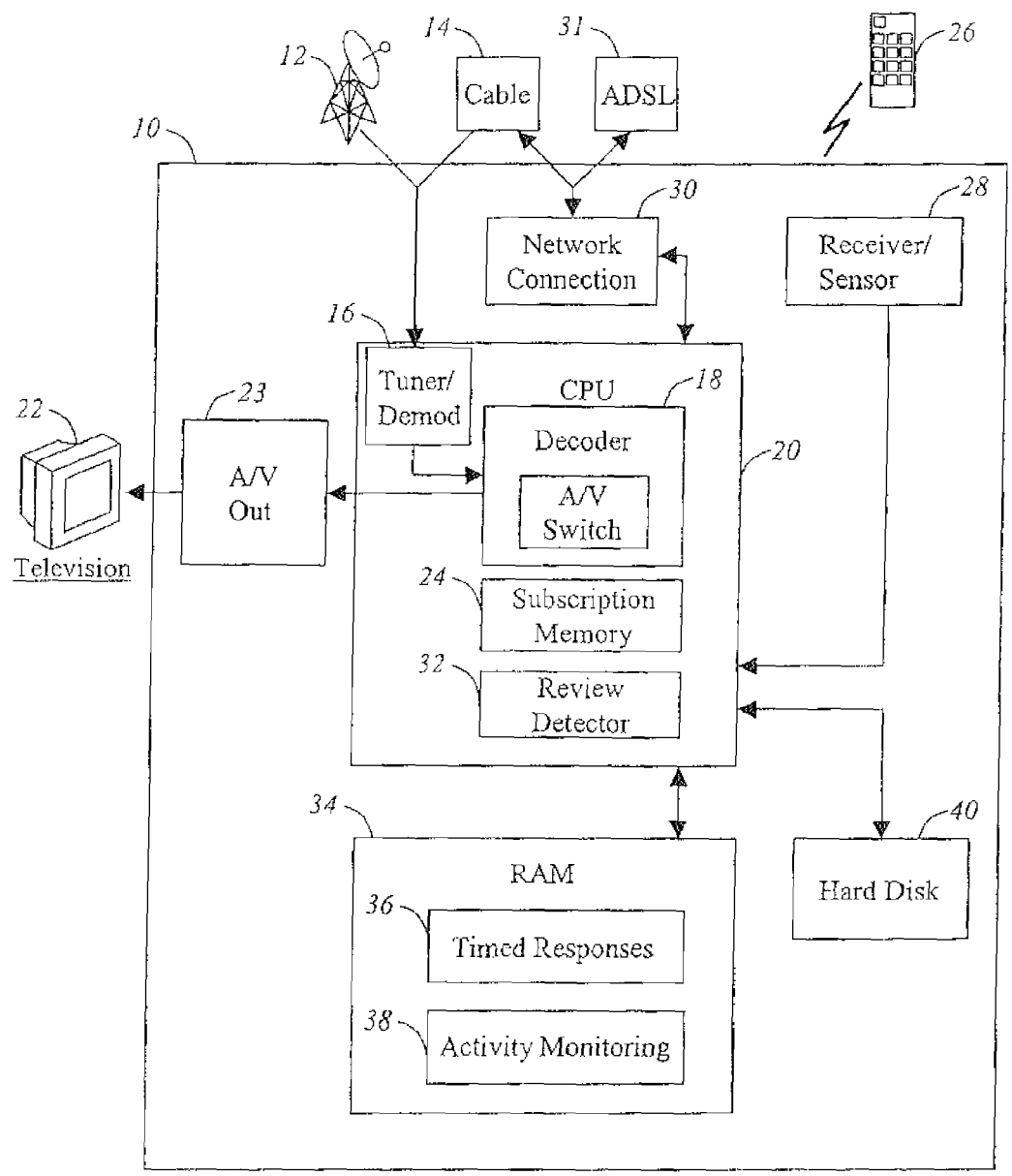
FIG. 1 is an exemplary schematic diagram of a set top box according to an exemplary embodiment of some of the embodiments of this invention.

Referring now to the drawings, in which like numerals indicate like elements throughout the several figures, FIG. 1 illustrates an exemplary hardware environment in which a conventional set top box (STB) 10, such as a set top box operable for monitoring viewing habits and collecting information, receives encoded television signals either from a satellite receiver 12 or a cable feed line 14, which is fed to a tuner/demodulator 16 for receiving digital signals. The STB 10 may be similar to the STB described in U.S. application Ser. No. 09/496,825, filed Feb. 1, 2000, which is incorporated herein by reference. The digital signals are divided into audio and video (A/V) signals. The tuner/demodulator 16 tunes to the frequency of a broadcast stream that is selected by a viewer. The tuner/demodulator 16 feeds into a decoder 18 in a central processing unit (CPU) 20 in the set top box 10. The tuner 16 tunes to the frequency of a selected decoder 18 transport stream which is then decoded and fed to the television 22 via A/V out jacks 23.

Programming subscription memory 24 in the CPU 20 maintains a list of television stations that are available to the viewer in accordance with the subscription plan arranged by the user of the STB 10. In order to select a channel, the CPU 20 either receives signals from a user input device, such as a remote control unit 26 via a remote control sensor 28, or receives signals from the television unit 22. The STB 10 includes a control interface for accepting viewer commands from the remote control unit 22.

The STB 10 includes a network connection/modem 30 by which the set top box 10 may transmit and receive data from the cable or satellite television system provider. The network connection modem 30 may include an asymmetric digital subscriber line (ADSL) 31 modem or a cable modem. In conventional satellite television systems, the STB 10 initiates a call to the satellite system service provider in order to provide billing information, such as movie purchases.

The STB 10 additionally includes a television review detector 32. The detector 32 receives responses from a television viewer that is using the interactive two-way communication method of some of the embodiments of this invention, as will be described below, via the remote control unit 26 and the remote control sensor 28. A random access memory module (RAM) 34 is operable for storing files and includes a timed response monitoring module 36, which time stamps a viewer's indicated response, and a viewer action's monitoring module 38, which monitors the viewer's indicated responses. The RAM module 34, timed-response monitoring module 36, and viewer action's monitoring module 38 are accessed by the CPU 20 during the operation of the two-way communication method of some of the embodiments of this invention. Memory intensive files may be stored in a hard disk 40.

Persons skilled in the art will recognize that some of the embodiments of this invention may be used with any of a variety of interactive media delivery systems, standard or wireless cable television systems, satellite television systems, internet protocol television (IPTV), and/or other media delivery systems that allow duplex communication (perhaps with the return path via a separate (e.g. telephone, cable, data, satellite, etc.) network) to the STB 10 coupled to the viewer's television set 22 or alternate display device or the like. Some of the embodiments of this invention may be used in conjunction with additional demographics and programming ratings collection systems that may be deployed for use on an interactive media delivery system.

The CPU 20 in the STB 10 collects information to create a log relating to all or selected events of interest. An event is defined as an action or a change in the state of the STB 10 that is deemed important to building a knowledge base on particular viewers, their viewing patterns, and viewer response behavior. The CPU 20 records response times to audio/visual cues or events provided by the viewer through the actuation of a key on a user input device, such as a remote control unit 26. Viewer response times are then processed and evaluated for the purposes of competition, discounts, incentives, awards, polling, voting, surveying, and other purposes.

Broadly stated, some of the embodiments shown in FIG. 1 build upon the ability of the STB processor 18 to record the actions of a viewer while watching television. By actuating a key on a remote control unit 26 based upon audio/visual cues, viewer behavior may be recorded, transmitted if necessary, and then processed in order to evaluate the viewer behavior. Since each viewer action is time-stamped, a recreation of the viewer action sequence in time may be generated, which may be compared against any known sequence of events.

According to an exemplary embodiment, a television programming stream (network show, advertisement, gaming program, polling or survey program, etc.) presented over a particular period of time may include one or more intentional or incidental occurrences of audio/video content or events, such as the display of products, a word, a sound, an action by an actor, an effect, or any other recognizable event. Responses to these cues may be used as part of an award, incentive, measurement, market test, individual skill (including visual) measurement, marketing, customer sensitivity to product measurement program, competition, contest, and/or entertainment device.

Figure 2:
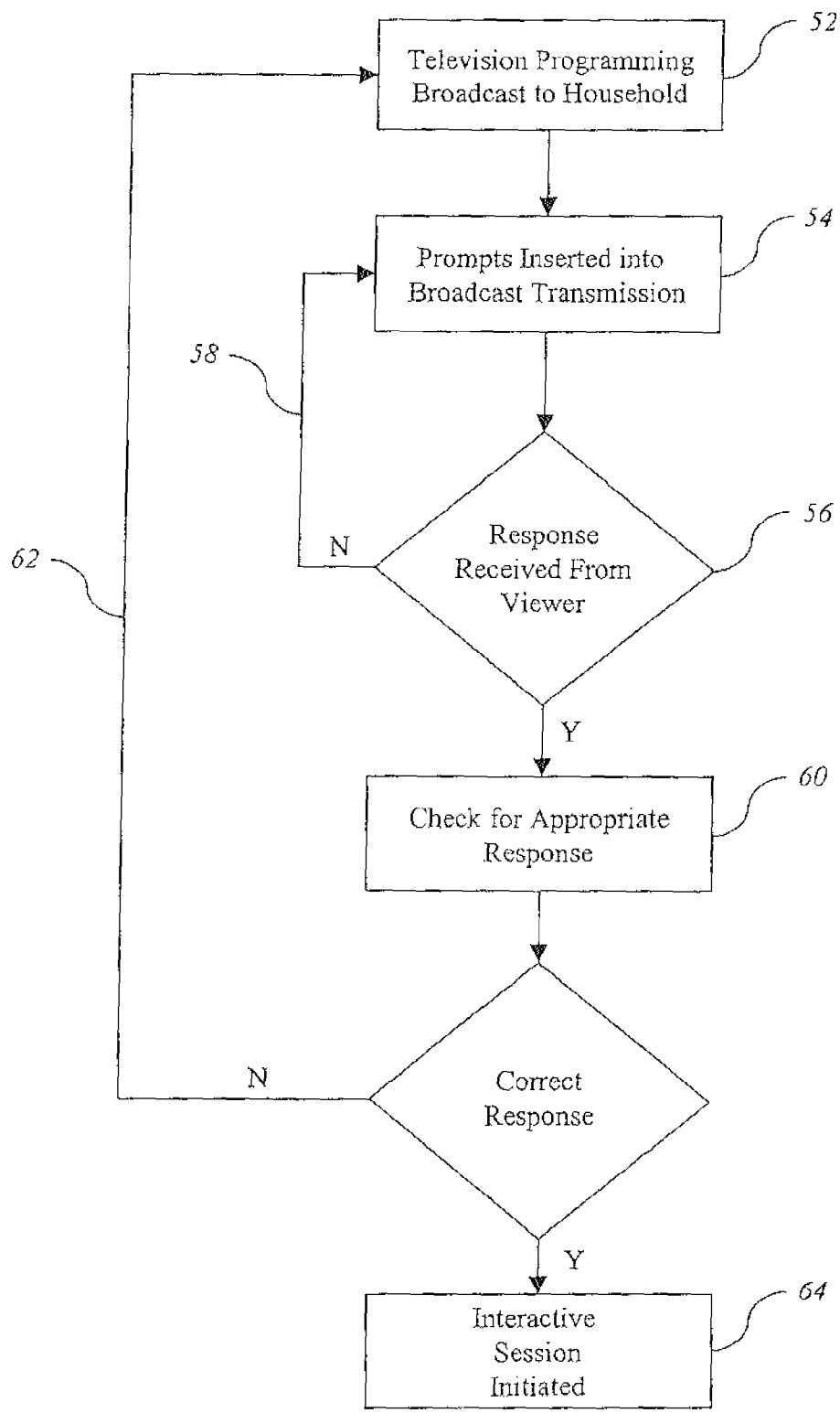
FIG. 2 is a flow diagram for prompting a viewer during a television broadcast and recording viewer response times using the set top box of FIG. 1 according to another exemplary embodiment of some of the embodiments of this invention.

FIG. 2 is a flowchart illustrating the steps involved in collecting and analyzing event data and delivering incentives, and the like, for the interactive session model, according to some of the embodiments of this invention. While the steps described herein and illustrated in the flowchart contain many specific examples of information, these steps should not be construed as limitations on the scope of the invention, but rather as examples of steps that could be used to practice the invention.

In step 52, a new interactive session may begin when a television broadcast is transmitted to a television set 22 through the STB 10. As described in FIG. 1, the viewer may access television stations included in the viewer's programming subscription via a user input device, such as a remote control unit 26 via a remote control sensor 28. The viewer's remote control unit 26 may include a dedicated "interactive session" pushbutton, or the viewer may actuate one or a series of pushbuttons in response to a prompt that is displayed on the television set 22, STB 10, or broadcast as an audio signal. Although there may be one or more dedicated pushbuttons on the remote control unit 26 for responding to prompts, the interactive system may utilize remote control unit 26 pushbuttons for multiple purposes.

The viewer may also be required to identify himself/herself using a personal identifier, such as a personal identification number (PIN). The personal identifier may be used to distinguish between different members of a household. In an alternative embodiment, the interactive system may be configured to automatically begin or continue a previously initiated session each time the television set 22 is turned on.

To initiate an interactive session, instruction signals or prompts may pre-exist in the content stream or may be inserted into the content stream by the CPU (20, FIG. 1) at step 54, and are provided to the viewer through any of the methods described above. The CPU 20 acts upon the incoming content stream from the tuner/demodulator (16, FIG. 1) and decode (18, FIG. 1) and may superimpose any new audio/video cues upon that stream. The STB 10 may provide a display that prompts the viewer to actuate one or a series of pushbuttons on the viewer's remote control unit 26 at specific times during the broadcast transmission. An example of a display prompt may include such visual cues as "start" displayed in the corner of the television 22 screen, an audible beep or word, or the appearance of a product within a subject program.

In step 56, the STB 10 of FIG. 1 detects if a response to an instruction or prompt is received through the infrared (IR) sensor (28, FIG. 1) of the STB 10 and the television review detector (32, FIG. 1). In step 58, if there is no response received from the viewer, a second prompt may be inserted into the broadcast transmission. The second prompt may be inserted after a pre-determined time period, a minute for example, in order alert the viewer to the interactive session in case the viewer missed the first prompt. In one embodiment, additional prompts may be inserted into the broadcast transmission at various time intervals, such as every fifteen minutes, every half-an-hour, or every hour, for the purpose of informing the viewer that an interactive session may be initiated.

In step 60, after it has been detected that a response has been received from step 56, the system checks whether the viewer has entered an appropriate response to a prompt. The particular configuration of the system depends upon whether the prompt is generally located in the STB 10 or broadcast by the network. For example, if the prompt is generated by the CPU 20 of the STB 10, then the response activity monitor 38 detects whether the viewer responds within a certain number of seconds after the prompt is generated. However, if the prompt is broadcast by the television network, then the response activity monitor 38 may periodically download codes and acceptable response timing information via the network connection 30 from the television network. In such case, the STB 10 maintains a database of remote controller codes and corresponding time periods when the codes are to be transmitted by a viewer.

If a viewer response is not received in the STB 10, the system in step 62 continues the broadcasting of the television programming in step 50 in the normal fashion. However, in step 64, if the viewer provides an appropriate response within the proper time then an interactive session has been initiated, the details of which are discussed below.

Figure 3:
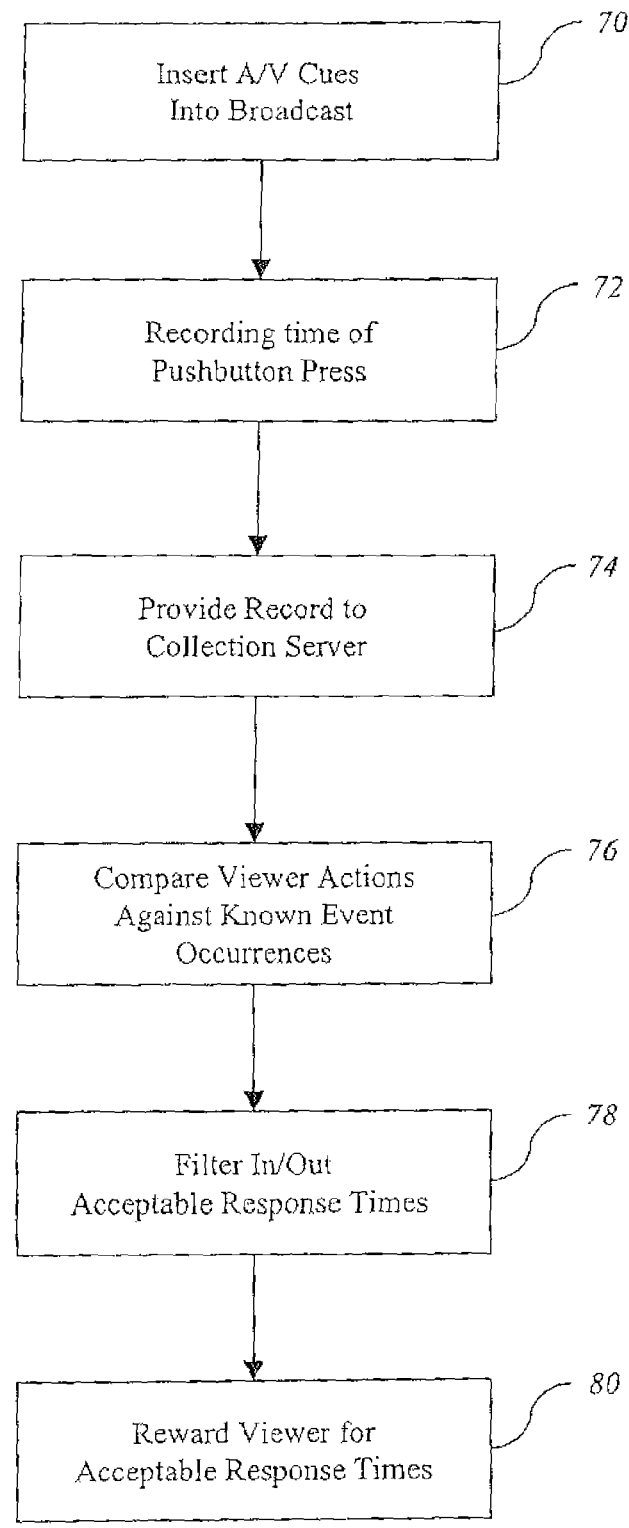
FIG. 3 is a flow diagram for providing rewards and incentives to a viewer who responds in an appropriate manner to one or more audio/visual cues using the set top box of FIG. 1.

FIG. 3 is a flow diagram illustrating an interactive session in which rewards and incentives may be provided to a viewer who responds in an appropriate manner to one or more audio/visual cues using the set top box of FIG. 1. At step 70, once an interactive session has been initiated by a viewer (step 64, FIG. 2), one or more audio/visual (A/V) cues are inserted into the television broadcast stream or alternate media programming (e.g., gaming application). The television broadcast stream (network show, advertisement, etc.) presented over a particular period of time may include one or more intentional or incidental occurrences of A/V content or events, such as the display of products, words, sounds, actions by an actor, effects, or any other recognizable event. The A/V cues may be presented for the purpose of obtaining and receiving information, incentives, awards, measurements, marketing information, viewer skill measurements, customer interests, voting, polling, and/or contests.

At step 72, the STB 10 records when a pushbutton is actuated and the time at which the press was performed. At step 74, the STB 10, when appropriate, provides the pushbutton time record of viewer actions to a collection server at the data-center/head-end of the operator of the interactive system (e.g., cable operator, direct-to-home satellite video operator, advertiser, etc.). The record of viewer actions may then be compared at the data-center against a known sequence of event occurrences provided by the content programmer, in step 76. The known sequence of events occurrences may be provided as a time/event listing that may be stored as an electronic database file. The comparison may be done to determine which known events were detected by the viewer and the latency associated with the viewer's actuation of the designated pushbutton. At step 78, the latency between event presentation and viewer action may, if desired, be used to filter in/out acceptable response times for various purposes.

Given that viewer identity is known based upon viewer identification, as described above, at step 80 the viewer may be rewarded or otherwise recognized for their diligent viewing of the presentation and appropriate time responses to A/V cues. The interactive system may retrieve the viewer's account information and display a description of the awards that are available to that viewer based upon the viewer's response times and number of correct responses.

In one embodiment, the STB 10 connects to and sends viewer identification information and response data to an external network via the network connection 30 described above. The operation of the external network may be sponsored by the cable television provider or the digital satellite network. Alternatively, the external network may be operated by a separate market research company affiliated with the cable television provider or the digital satellite network. As another option to increase the effectiveness of the interactive system with regards to advertising, a viewer's time response data may be transmitted through the STB 10 directly to a vendor. For example, if a viewer presses the remote control key within an appropriate amount of time when a well known beverage can is displayed in a movie, the vendor may then directly provide the viewer with an award, such as a coupon for the beverage received in the mail. In that case, the STB 10 transmits a signal through the network connection 30 to indicate that the viewer is to receive a coupon. The signal may include a viewer identification number, the date at which the interactive session took place, the response times of the viewer, and the particular product or service being presented to the viewer.

The methods and systems of some of the embodiments of this invention may be used to sponsor various viewing incentive activities, such as activities and competitions for individual and multiple viewers to note and respond to events, whereby viewers with the either individually or comparatively highest score based on events noted and response times may receive special awards, prizes, discounts on products, etc. A/V cues may be sent at the beginning of a program and may include may include examples such as "Find the 15 times that a widget is displayed during this movie and receive a $1 discount coupon for a widget purchase", "The three highest scores noting each time an advantage of the new widget is mentioned will receive a free one", and scoring a boxing match along with the judges. Given that there are multiple pushbuttons on a remote control unit 26, it is possible for multiple events to be tracked, recorded, and evaluated simultaneously.

Viewer response time data may be sent through the STB 10 to the data-center for the purpose of confirming, in creative ways, that the viewer is experiencing a program. Viewers may generate an additional interest in a program if they are rewarded for participating.

Additional uses of this systems and methods may include evaluating viewer response times for marketing purposes, such as the number of viewers participating in events, viewer performance, and incentives awarded. These marketing tools may provide advertisers and content managers with data which may lead to product placements in programming and viewer awareness of products within a television program including product sensitivity. In addition, appropriate responses and response times may be evaluated to measure individual viewer skills, such as visual and audio skill measurements. For example, visual tracking problems may be tested, evaluated, and trained. In another example, audio pitch skills may be broadcast and tested. A musical note may be broadcast and a response given identifying the note, such as the difference between an "A" and a "C". Skills testing may be accomplished based upon response times Some of the embodiments of this invention may be enabled for positive instant-feedback to the viewer or delayed feedback to the viewer. In a STB 10 without substantial internal processing, logic, and extra programming associated with it, the interactive system of some of the embodiments of this invention may be restricted to a delayed-type feedback system in which the post processing of viewer reactions take place. In this type of system, viewer actions and response times may be sent to through the STB 10 to a data-center where they are processed. Processing may include determining whether or not response times match up correctly or adequately relative to other individuals or a known set of events. A response may then be provided back to the user via email, the telephone, or U.S. mail.

In a positive instant-feedback system in which a STB 10 is capable of more substantial logic and processing, the system may provide instant feedback to a viewer. For example, if a viewer respond to a specific A/V cue in an appropriate amount of time, the STB 10 may temporarily display an A/V cue back to the viewer, such as a check-mark or a thumbs-up symbol displayed in the corner of the television set 22 display. In a further embodiment, a rolling tally may be displayed which provides the viewer with a score, the score being based upon correct responses and response times. Data item/tags may be placed within an A/V stream at specific time points. These tags may be inserted by the program provider and indicate that an event item is being presented at a certain time within a show. The tag may also indicate the time within which a response is required as well as the specific remote control unit 26 button to be actuated. A STB 10 equipped to detect the in-stream tags may then monitor an action by the viewer which, if detected, may generate an audio or visual feedback indicating whether the viewer response has occurred within the timeframe required and perhaps if the correct pushbutton has been actuated.

To illustrate some of the embodiments of this invention in a real-world example, assume that a viewer has chosen to watch a Sunday afternoon football game. As a subscriber of television programming utilizing some of the embodiments of this invention, the viewer is shown a prompt at the very beginning of the game. The prompt is displayed as a visual message appearing in the corner of the television set 22 display. The prompt is inserted into the broadcast transmission by the CPU 20. The prompt may read, for example, "Click on your remote control every time the camera pans to the Gatorade™ cooler on the sidelines. Identify it within five seconds three times in a row and receive $1 off your next purchase."

The viewer may opt to participate in the session by actuating a pushbutton on the remote control unit 26, or may opt not to proceed and actuate a cancel button on the remote control unit 26. When a viewer opts not to participate, all prompts will be discontinued to that viewer for a certain period of time, perhaps until the next show, or in another example, not until the next time that the viewer turns on the television set 22.

Assume for the purposes of this example that the viewer decides to participate in the interactive session. The football game begins and the first time that the Gatorade™ cooler appears the viewer actuates a pushbutton on the remote control unit 26 within five seconds of the appearance of the cooler. The remote sensor 28 sends an encoded message to the STB 10 where the CPU 20 time stamps the indicated response and sends it to a data-center via the network connection 30, where the timed response meets the requirements of the known sequence of events. The viewer then responds within five seconds to a second and third appearance of the cooler within the five second time designation. At this point, the viewer has fulfilled the requirements of the session and now qualifies to receive the coupon. The coupon may be sent via the U.S. Postal Service or via email, where it may be printed by the viewer.

To illustrate the use of some of the embodiments of this invention in a second real-world example, assume that an advertiser desires to collect information relating to the placement of the advertiser's product within a movie. Assume that BMW™ has paid to have one of their automobiles used in a new action movie. The star of the movie drives the car in six different scenes, and in those six scenes the BMW™ emblem is shown. To collect information relating to the effectiveness of the placement of the automobile, the advertiser may employ some of the embodiments of this invention.

Viewers subscribing to the interactive media service of some of the embodiments of this invention are prompted at the beginning of the movie by the media delivery service of the details of the session. To initiate a session, a viewer accepts the session by actuating a pushbutton on their remote control unit 26 which includes a sensor 28 that sends an encoded signal to the STB 10. Each time that the automobile appears, each time being a visual cue, the viewer actuates a pushbutton on their remote control unit 26. The STB 10 receives an encoded signal from the remote control unit 26 and time stamps the response and sends it to a data center via the network connection 30. In another example, the STB 10 collects each viewer response, time stamps it, and then transmits all of the time-stamped viewer actions to the data center at the conclusion of the movie.

The advertiser may then compare viewer actions to the known sequence of automobile occurrences in order to determine the effectiveness of product placement. The comparison information may be used as a marketing tool and for future product placement decisions. A viewer response log may be sent to each viewer detailing their performance.

While several exemplary embodiments of this invention are described herein, various modifications and alternate embodiments will occur to those of ordinary skill in the art. For example, other protocol requests for a media programming stream, such as Hyper-Text Transfer Protocol (HTTP) and/or other protocols utilizing various formats, such as URL formats, Extensible Style Sheet (XSL) formats, Real Simple Syndication (RSS) that uses XML structures and others may be similarly used to communicate the programming media stream from a content source and used to communicate the response (to a prompt or cue). Accordingly, some of the embodiments of this invention are intended to include those other variations, modifications, and alternate embodiments that adhere to the spirit and scope of this invention.

What is claimed is:

1. A method, comprising:
   receiving, at a device, media programming;
   causing, by the device, simultaneous display of prompts during the media programming, the prompts prompt a viewer to provide responses;
   receiving, by the device, the responses to the prompts;
   determining, by the device, a time associated with each of the responses;
   comparing, by the device, the responses to events stored in memory;
   determining, by the device, a match between a response of the responses and an event of the events;
   determining, by the device, a latency between the time of the event and the time of the response; and
   determining, by the device, a performance of the viewer based on the latency.

2. The method of claim 1, further comprising retrieving an incentive associated with the performance of the viewer.

3. The method of claim 1, further comprising receiving an incentive in response to the performance of the viewer.

4. The method of claim 1, further comprising sending the responses to a server.

5. The method of claim 1, further comprising displaying the prompts.

6. The method of claim 1, further comprising displaying an incentive related to the performance of the viewer.

7. The method of claim 1, further comprising disregarding the response.

8. A system, comprising:
   a processor; and
   a memory storing code that when executed causes the processor to perform operations, the operations comprising:
   receiving media programming;
   causing simultaneous display of prompts during the media programming, the prompts prompt a viewer to provide responses;
   receiving actions in response to the prompts;
   determining a time associated with each of the actions;
   comparing the actions to events;
   determining a match between an action of the actions and an event of the events;
   determining a latency between the time of the event and the time of the action; and
   evaluating a performance of the viewer based on the latency.

9. The system of claim 8, wherein the operations further comprise retrieving an incentive associated with the performance of the viewer.

10. The system of claim 8, wherein the operations further comprise receiving an incentive in response to the performance of the viewer.

11. The system of claim 8, wherein the operations further comprise sending the actions to a server.

12. The system of claim 8, wherein the operations further comprise displaying the prompts.

13. The system of claim 8, wherein the operations further comprise displaying an incentive related to the performance of the viewer.

14. The system of claim 8, wherein the operations further comprise disregarding one of the responses.

15. A memory storing instructions that when executed cause a processor to perform operations, the operations comprising:
   receiving media programming;
   causing simultaneous display of prompts during the media programming, the prompts prompt a viewer for responses;
   receiving actions in response to the prompts;
   determining a time associated with each of the actions;
   comparing the actions to events;
   determining an action of the actions matches an event of the events;
   determining a latency between the event and the action; and
   evaluating a performance of the viewer based on the latency.

16. The memory of claim 15, wherein the operations further comprise retrieving an incentive associated with the performance of the viewer.

17. The memory of claim 15, wherein the operations further comprise receiving an incentive in response to the performance of the viewer.

18. The memory of claim 15, wherein the operations further comprise sending the actions to a server.

19. The memory of claim 15, wherein the operations further comprise displaying the prompts.

20. The memory of claim 15, wherein the operations further comprise displaying an incentive related to the performance of the viewer.

* * * * *